(12) United States Patent
Baker et al.

(10) Patent No.: US 12,004,690 B2
(45) Date of Patent: Jun. 11, 2024

(54) DEEP FAT FRYER FRYPOT

(71) Applicant: FRYMASTER LLC, New Port Richey, FL (US)

(72) Inventors: Justin T. Baker, Shreveport, LA (US);
Eric Pitchford, Shreveport, LA (US);
Ralph Macy, Shreveport, LA (US);
Henry Preston Hutson, Jr., Bossier City, LA (US)

(73) Assignee: FRYMASTER, LLC, New Port Richey, FL (US)

(*) Notice: Subject to any disclaimer, the term of this patent is extended or adjusted under 35 U.S.C. 154(b) by 37 days.

(21) Appl. No.: 17/459,679

(22) Filed: Aug. 27, 2021

(65) Prior Publication Data

US 2023/0068881 A1 Mar. 2, 2023

(51) Int. Cl.
*A47J 37/12* (2006.01)
*A47J 36/02* (2006.01)
*B21D 28/26* (2006.01)

(52) U.S. Cl.
CPC .............. *A47J 37/129* (2013.01); *A47J 36/02* (2013.01); *B21D 28/26* (2013.01)

(58) Field of Classification Search
CPC .......... A47J 37/129; A47J 36/02; B21D 28/26
USPC ...................................................... 220/573.1
See application file for complete search history.

(56) References Cited

U.S. PATENT DOCUMENTS

| | | | |
|---|---|---|---|
| 4,001,451 | A | 1/1977 | Veeneman et al. |
| 5,724,887 | A * | 3/1998 | Hakvoort .............. A47J 37/129 |
| | | | 99/330 |
| 7,141,764 | B1 | 11/2006 | Shumate |
| 2002/0096170 | A1* | 7/2002 | Takahashi ........... A47J 37/1223 |
| | | | 99/403 |
| 2003/0111072 | A1 | 6/2003 | Takeda et al. |
| 2010/0212510 | A1 | 8/2010 | Hutson et al. |
| 2010/0212691 | A1* | 8/2010 | Hutson ..................... B08B 3/14 |
| | | | 134/10 |
| 2011/0192232 | A1 | 8/2011 | Kuwayama et al. |
| 2020/0359838 | A1 | 11/2020 | Amadei et al. |
| 2021/0378446 | A1* | 12/2021 | McFadden ............ F23L 17/005 |

OTHER PUBLICATIONS

Specification Sheet for OCF30G; Ultimate Oil-Conserving Gas Fryers; dated Feb. 15, 2013.
International Preliminary Report on Patentability dated Oct. 27, 2023 for PCT Application No. PCT/US2022/039611.
International Search Report dated Oct. 28, 2022 for PCT Application No. PCT/US2022/039611.
Written Opinion dated Oct. 28, 2022 for PCT Application No. PCT/US2022/039611.

* cited by examiner

Primary Examiner — J. Gregory Pickett
Assistant Examiner — Niki M Eloshway
(74) Attorney, Agent, or Firm — Ohlandt, Greeley and Perle, LLP

(57) ABSTRACT

A frypot of a commercial deep fat fryer includes a foam deck and a front wall that is a downward extending vertical face of the frypot. The foam deck and the front wall are formed by sheet metal that has a radius bend between the foam deck of the frypot and the front wall. The radius has a bend radius of between 0.25 inches and 1.5 inches.

16 Claims, 9 Drawing Sheets

DEEP FAT FRYER FRYPOT

BACKGROUND OF THE INVENTION

1. Field of the Invention

This disclosure relates to deep fryers for the food service industry. More particularly, this disclosure relates to a new construction of deep fryer frypots to improve their durability.

2. Description of Related Art

Deep fryers are commercially used by restaurants, institutional kitchens, and fast food establishments for cooking a variety of food products, such as French fries, fish, fried chicken, and the like. The food product is cooked by total immersion within a frypot that is filled with heated oil or shortening. Often the food being cooked is held in baskets while it is immersed in the oil.

Because deep fat frying is a rapid process, batches of food in the fryer baskets are inserted and removed from the fryer's frypot very frequently, often over a hundred times each day. In addition, the frenetic pace of cooking in fast food restaurants often results in the fryer baskets not being treated gently. Because of this, fryer baskets can be repeatedly banged and dragged across the surface against the inside of the frypot hundreds of times each day. This repeated basket impact can result in the failure (e.g., leaks) of the frypot. This failure of the frypot frequently results in the need to replace the entire frypot, which is undesirably costly.

While virtually all commercial deep fat fryers have this problem, no one has yet suggested or implemented a solution to this problem.

SUMMARY OF THE INVENTION

The present disclosure describes a large-radius corner inside the frypot of a commercial deep fat fryer. This large radius bend inside the frypot is located at the usual point of failure. This larger radius bend distributes the metal-to-metal contact between the fryer basket and the frypot over a larger surface area. As a result, the frypot is more resistant to premature wear and failure.

BRIEF DESCRIPTION OF THE DRAWINGS

The foregoing and still other objects and advantages of the present invention will be more apparent from the following detailed explanation of the preferred embodiments of the invention in connection with the accompanying drawings.

DETAILED DESCRIPTION OF THE PREFERRED EMBODIMENT

Figure 1:
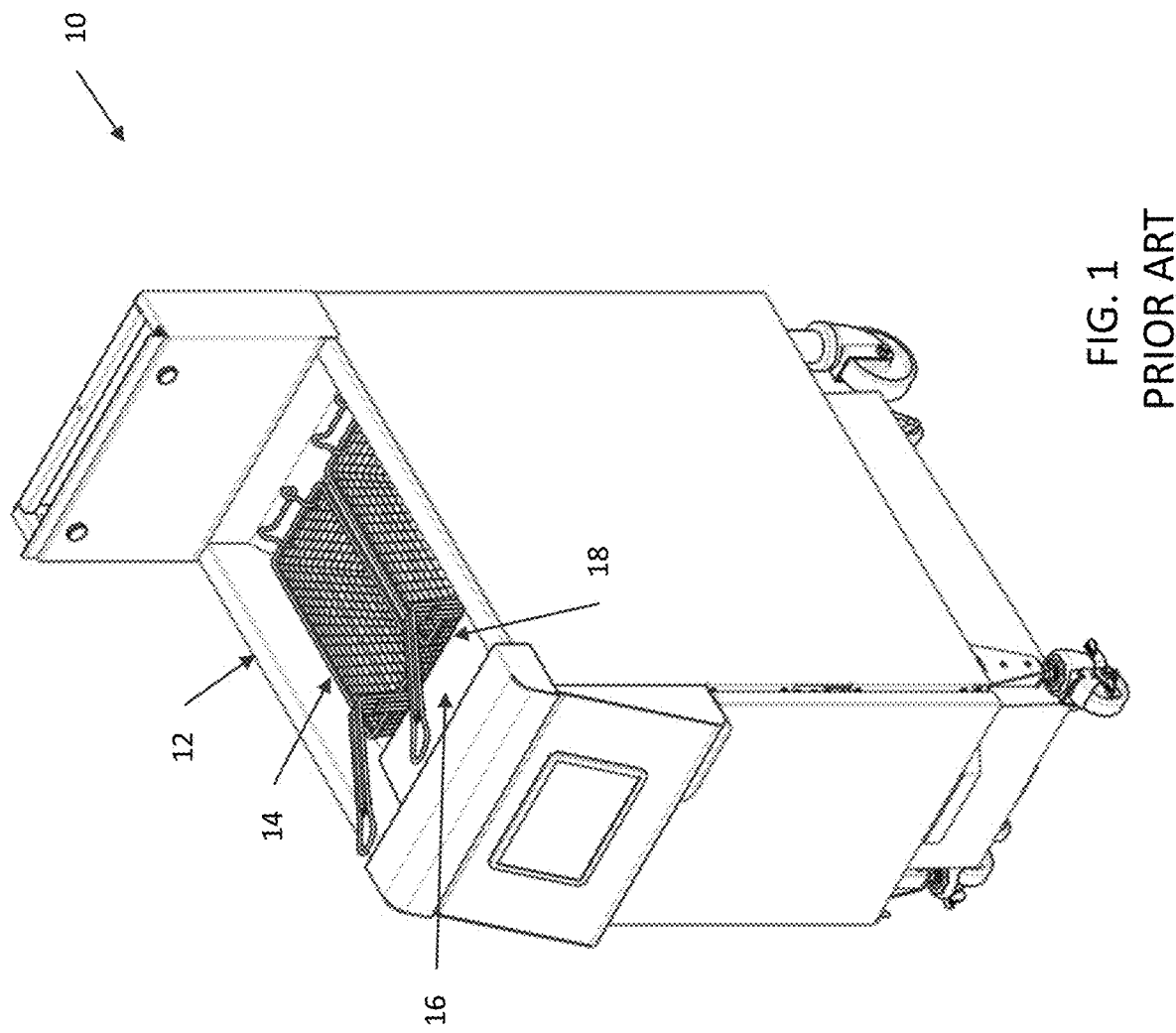
FIG. 1 illustrates a front isometric view of a conventional deep fryer having a frypot.

Referring to FIG. 1, a front perspective view of a deep fryer is shown, and generally referred to by reference numeral 10. Deep fryer 10 has a frypot 12 containing oil for deep frying foods commonly used in the commercial food industry. Deep fryer 10 has burners (not shown) disposed on a lower side of frypot 12 to heat cooking oil. Deep fryer 10 is shown as having one frypot 12; however, deep fryer 10 could have as many as four or six of frypots 12. Deep fryer 10 is shown with two fryer baskets 14 in frypot 12.

Figure 2:
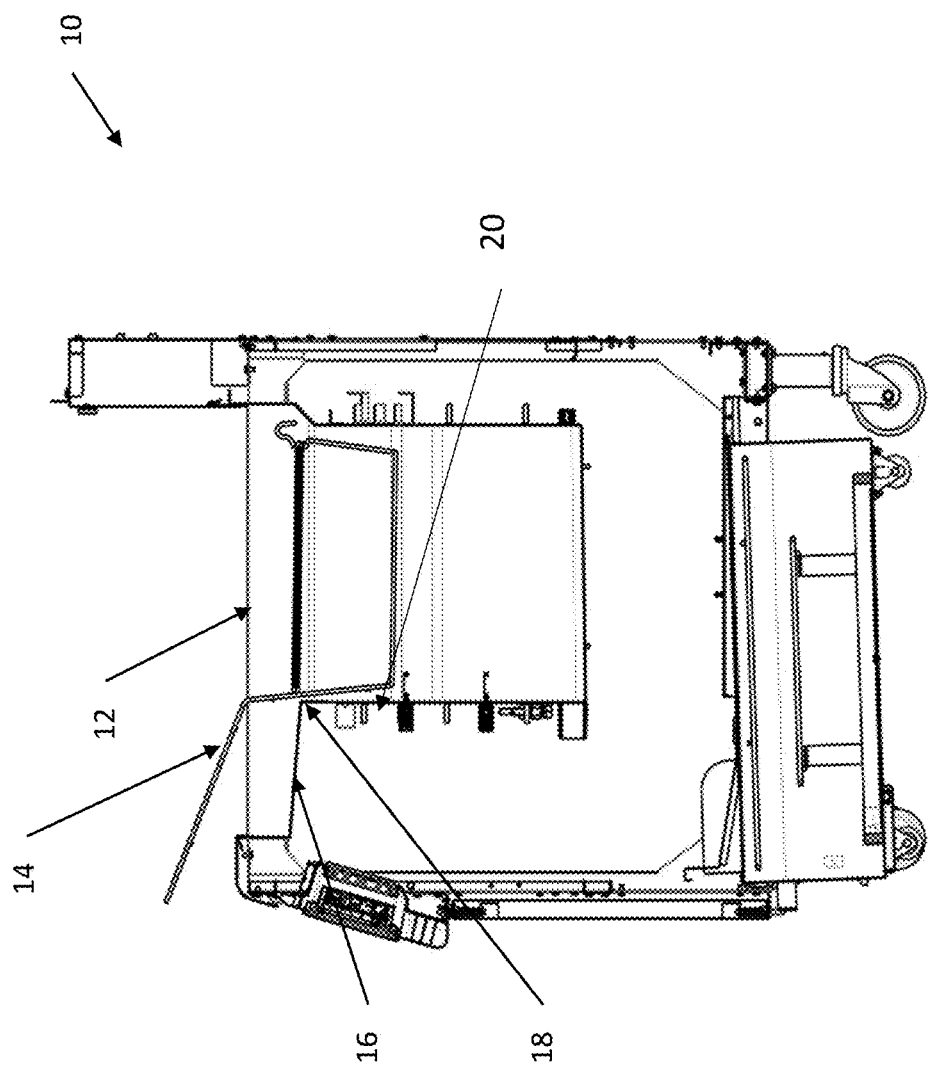
FIG. 2 illustrates a right-side cross-sectional view of the deep fryer of FIG. 1.

The front, sloped portion of frypot 12 is referred to as the foam deck 16. Foam deck 16 has an edge 18 where the sheet metal is bent downwards to a front wall 20 as shown in FIG. 2. Frypot 12 is generally made from 18 gauge ("ga") stainless steel.

Edge 18 is the location where most collisions between the frypot 12 and the fry basket 14 occur. These collisions can occur because the operator, who is typically in a rush to put the basket into the fryer 10 or to remove it from fryer 10, is in too big of a hurry to be careful about the trajectory of fryer basket 14. These recurring collisions can eventually cause the sheet metal of frypot 12 to fail at edge 18, creating an oil leak and the need to repair or replace frypot 12.

FIG. 2 is a right-side cross-sectional view of fryer 10 illustrating the location of edge 18 and fryer basket 14 inside frypot 12.

Figure 3:
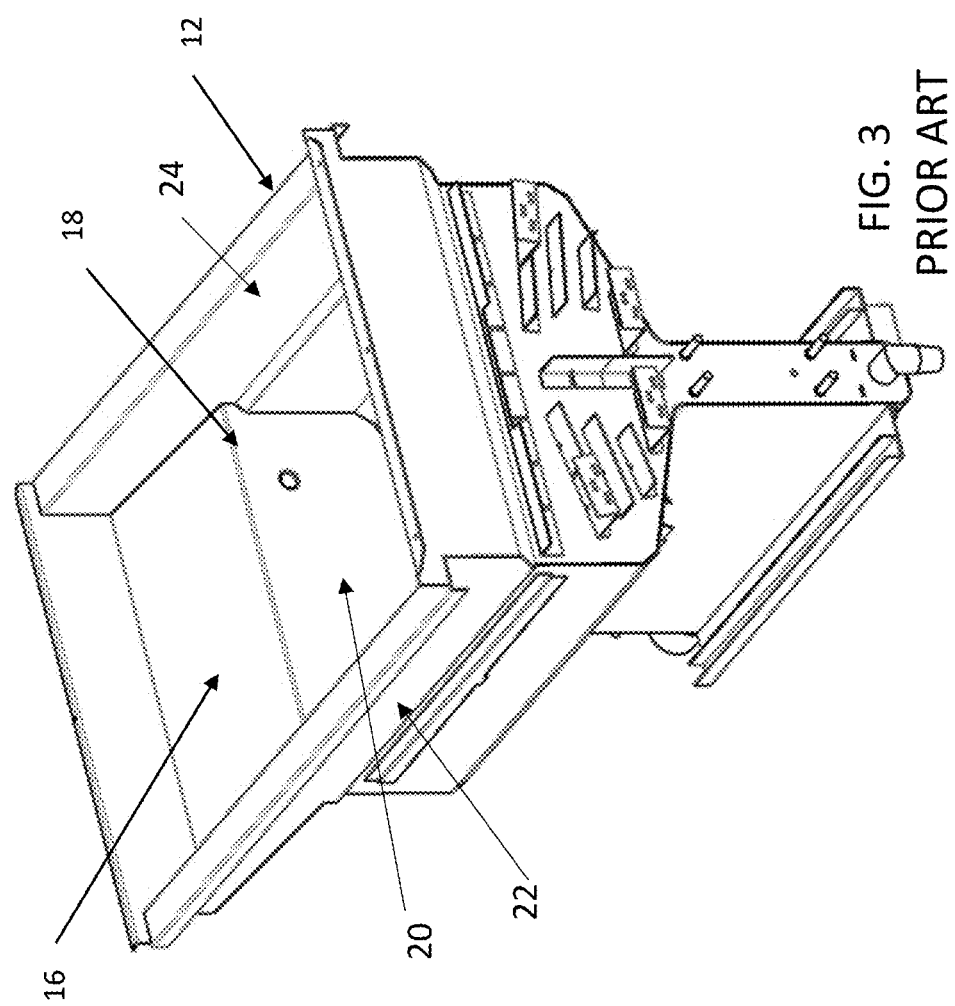
FIG. 3 illustrates a right-side, rear isometric view of the frypot of FIG. 1.

FIG. 3 is a right-side, rear isometric view of frypot 12 showing edge 18 at the edge of foam deck 16

Figure 6:
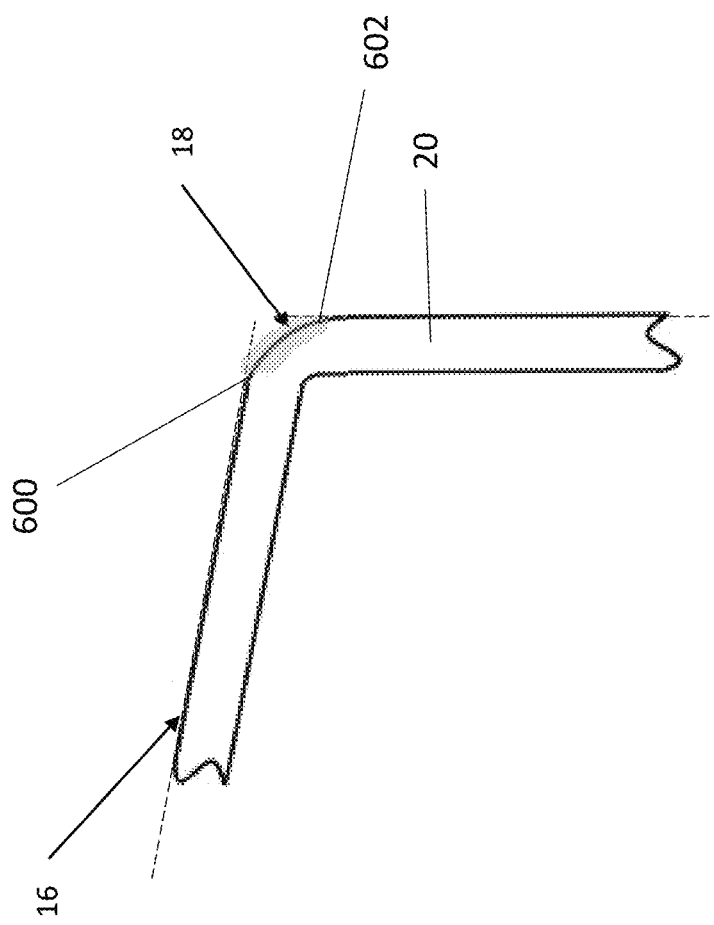
FIG. 6 illustrates a cross-section of a conventional frypot sheet metal radius.

FIG. 6 illustrates a cross-section of a conventional frypot sheet metal radius at edge 18. Typically a bend at location 18 is a sharp 95 degree bend. This type of sharp bend reduces the thickness of the sheet metal of frypot 12 due to material stretch that occurs during bending. This reduction in thickness reduces the strength of the metal at the bend location of edge 18 of frypot 12.

Figure 4:
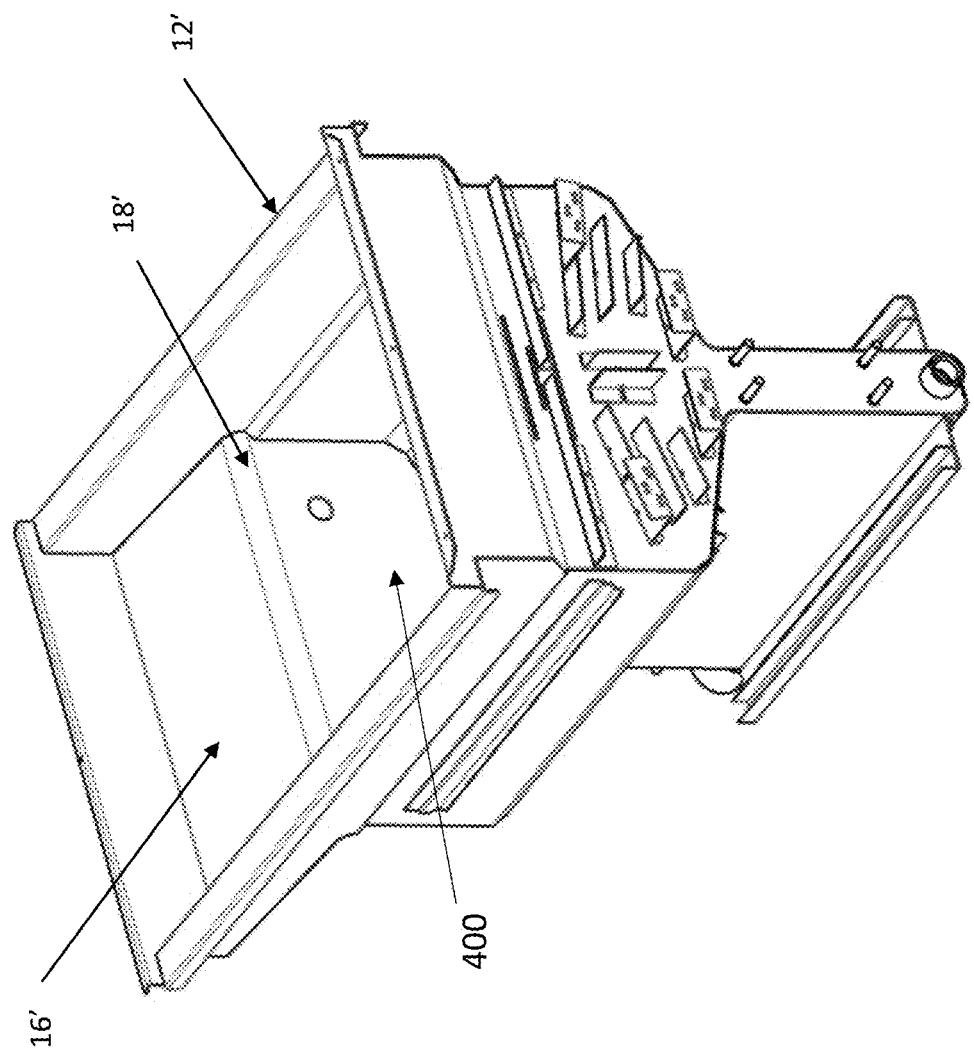
FIG. 4 illustrates a right-side, rear isometric view of a frypot according to the present disclosure.
Figure 5:
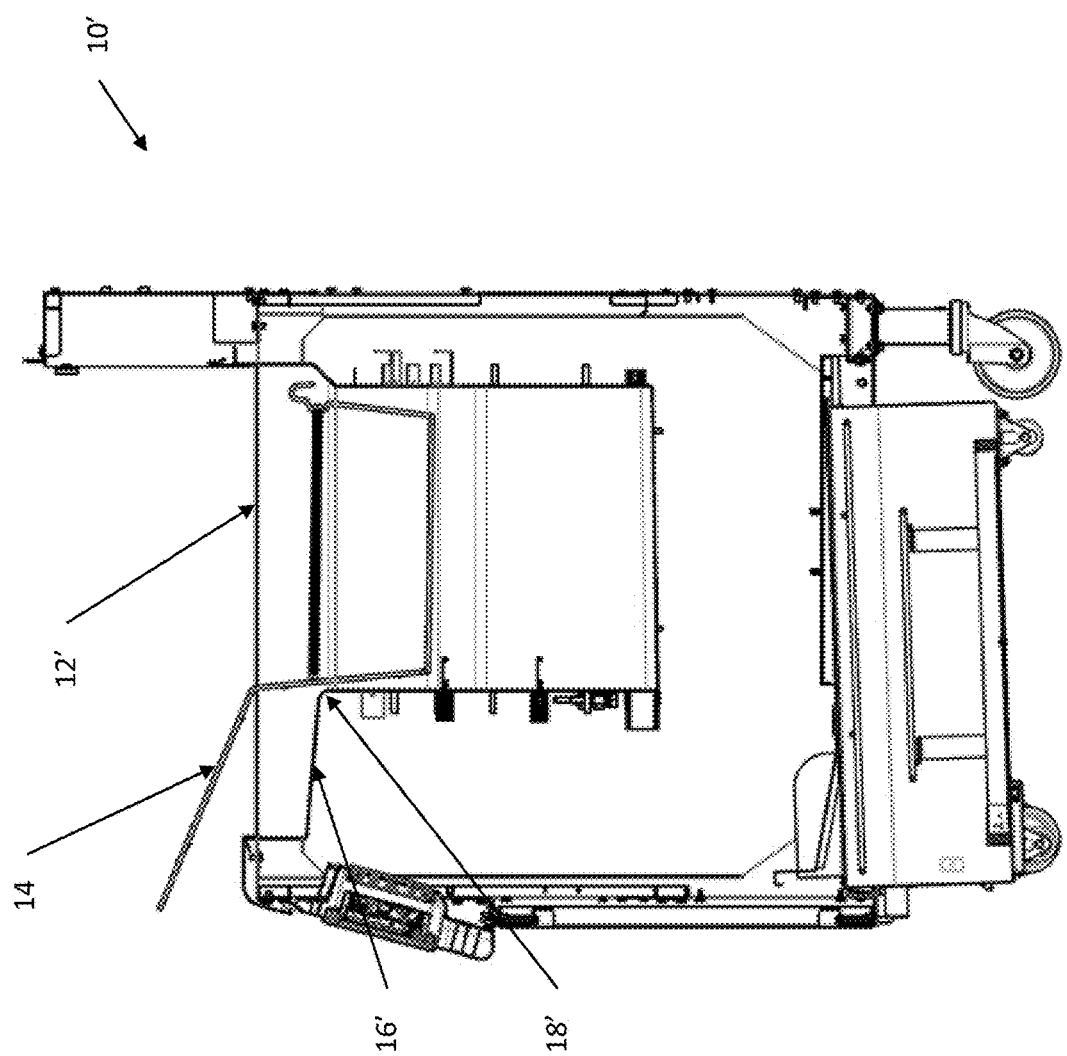
FIG. 5 illustrates a right-side cross-sectional view of a deep fryer having the frypot of FIG. 4.

FIG. 4 is a right-side, rear isometric view of a frypot 12' of the present disclosure that can be used with fryer 10' as shown in FIG. 5. Frypot 12' incorporates a radius bend 18' at the edge of foam deck 16'. Foam deck 16' has radius bend 18' where the sheet metal is curved downwards to a front wall 400. Radius bend 18' of foam deck 16' is formed by the sheet metal bend between foam deck 16' of frypot 12' and front wall 400 that is a downward extending vertical face of frypot 12'. Radius bend has a bend radius of between 0.25 inches and 1.5 inches.

Figure 7:
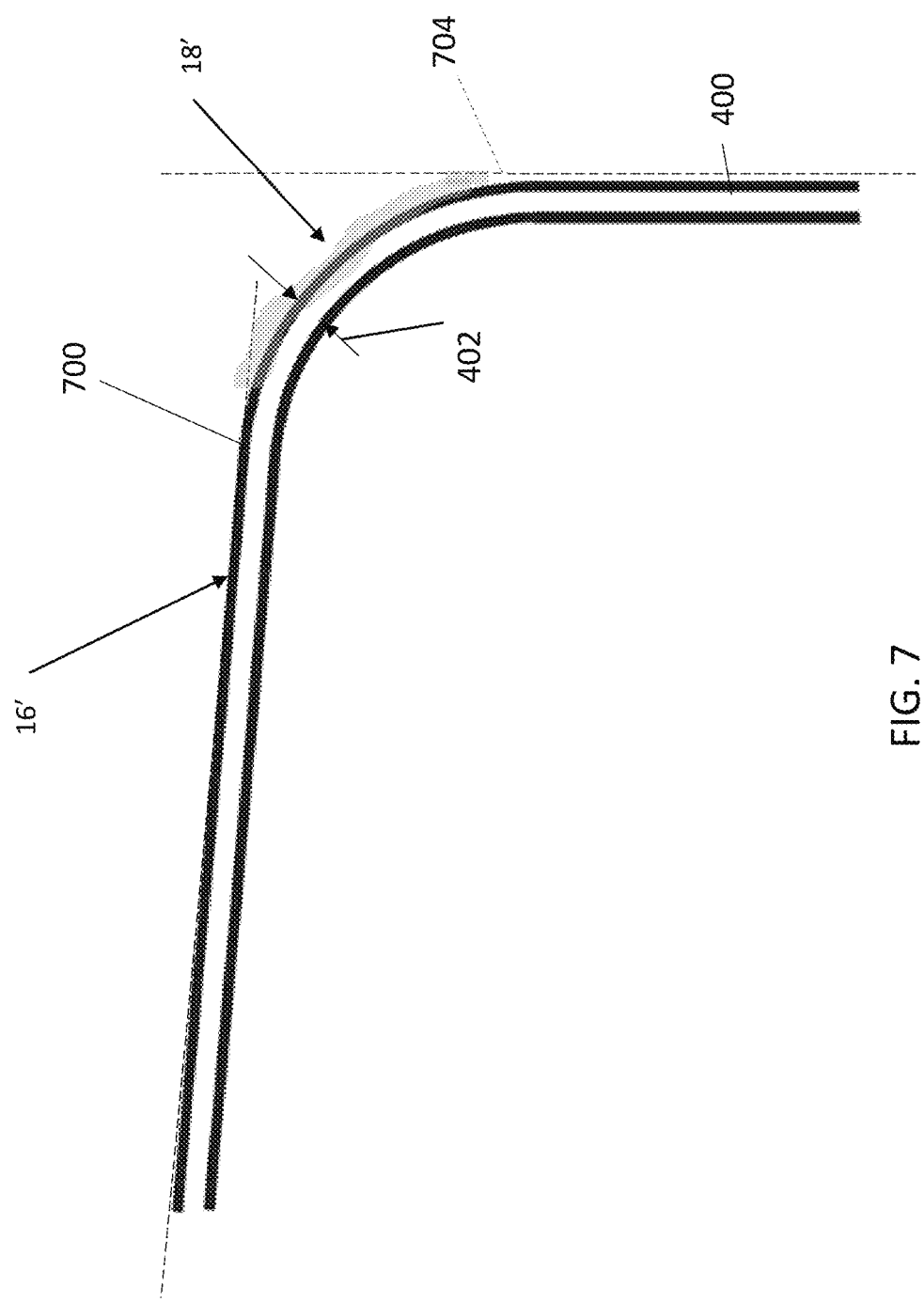
FIG. 7 illustrates a cross-section of a radius frypot bend, according to the present disclosure.

FIG. 7 illustrates a cross-section of the larger radius of radius bend 18' of frypot 12', according to the present disclosure. Radius bend 18', extending from foam deck 16' to front wall 400, does not cause a measurable reduction in a sheet metal thickness of frypot 12' due to a much larger radius of radius bend 18'. Accordingly, a thickness 402 of the metal sheet of foam deck 16', radius bend 18' and front wall 400 is substantially equal. The combination of the increased sheet metal thickness and the larger bend of radius bend 18' is what allows a more robust protection from the impact of the frybasket 14 and allows the increased reliability of the frypot 12'.

Radius bend 18' distributes over a larger surface area the metal-to-metal impact forces that can occur between fryer basket 14 and frypot 12' than edge 18 of frypot 12 when inserting or removing basket 14 from frypot 12'. As a result, frypot 12' is more resistant to premature wear and failure than edge 18 of frypot 12. Frypot 12' can be made from cold rolled or stainless steel, for example, 11-20 ga stainless steel. Further examples of frypot 12' are made from 18 ga stainless steel or 16 ga stainless steel.

FIG. 5 is a right-side cut-away view of fryer 10' illustrating the location of radius bend 18' and fryer basket 14 inside frypot 12' according to the present disclosure.

Figure 8:
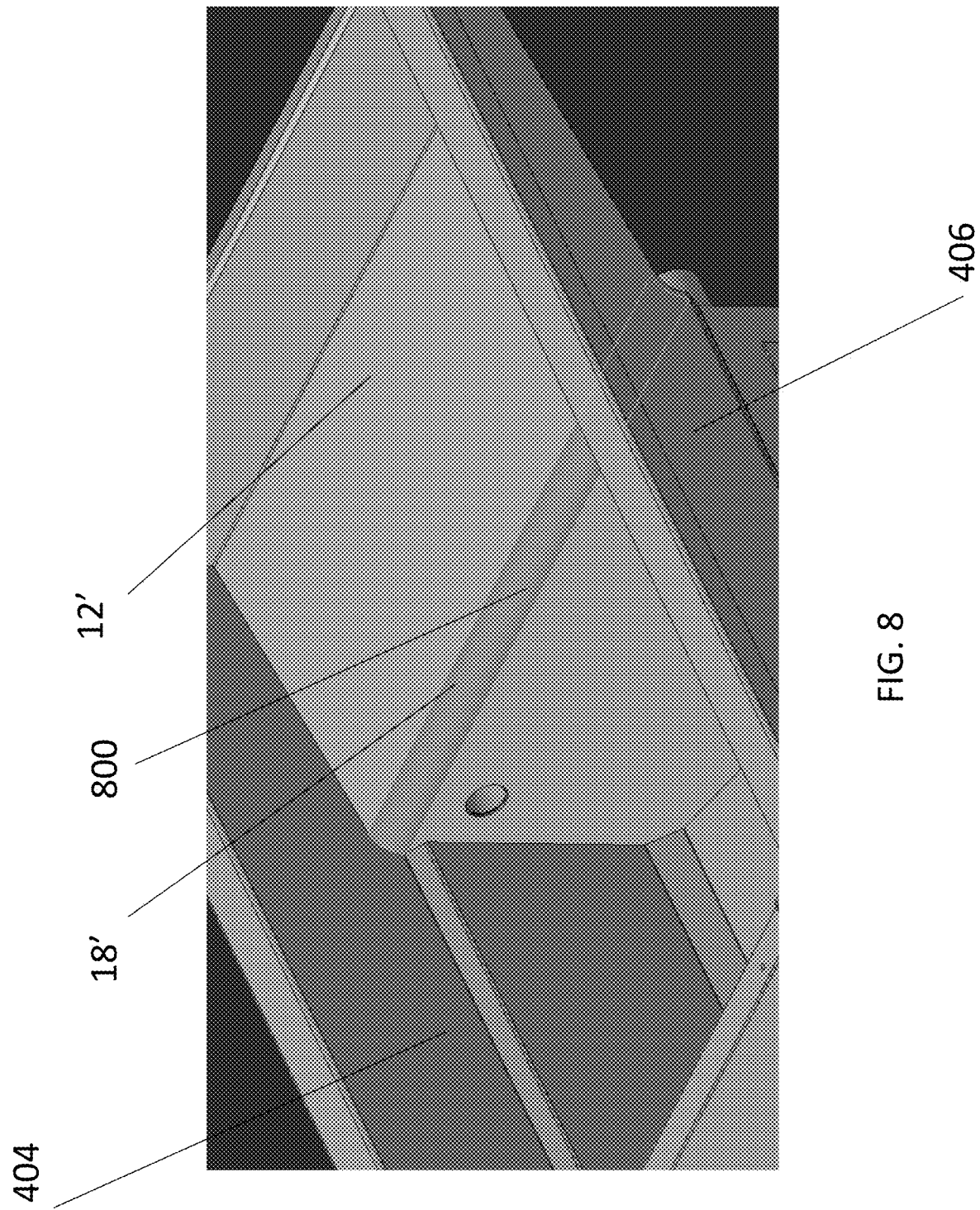
FIG. 8 is a partial rear, top perspective view of the frypot of FIG. 4.

Referring to FIGS. 6 and 7, there is a difference in area between a 0.032 inch sharp radius edge of edge 18 and 0.500 inch radius edge of radius bend 18' that is 1.56 square inches of edge 18 versus 9.84 square inches of radius bend 18'. The area of edge 18 is measured from a tangent 600 of foam deck 16 shown in a dashed line in FIG. 6 to a tangent 602 of a front face 20 of frypot 12 shown in a dashed line in FIG. 6 and from side wall 22 to side wall 24 shown in FIG. 3. The area of radius bend 18' shown in a highlighted portion 800 in FIG. 8 is measured from a tangent 700 of foam deck 16' shown in a dashed line in FIG. 7 to a tangent 704 of a front face 400 of frypot 12 shown in a dashed line in FIG. 7 and from side wall 404 to side wall 406 shown in FIG. 8. Radius bend 18' is approximately 1 inch in length measured from tangent 700 of foam deck 16' shown in the dashed line in FIG. 7 to tangent 704 of a front face 400 of frypot 12 shown in the dashed line in FIG. 7. The surface area of radius bend 18' having the 0.500 inch radius edge is 8.28 square inches more than or a 531% increase over the surface area of edge 18 having the 0.032 inch sharp radius edge of edge 18. Accelerated wear testing has shown this change in the geometry of radius bend 18' over edge 18 improves the reliability of this part of frypot 12' by at least 70% over frypot 12.

Figure 9:
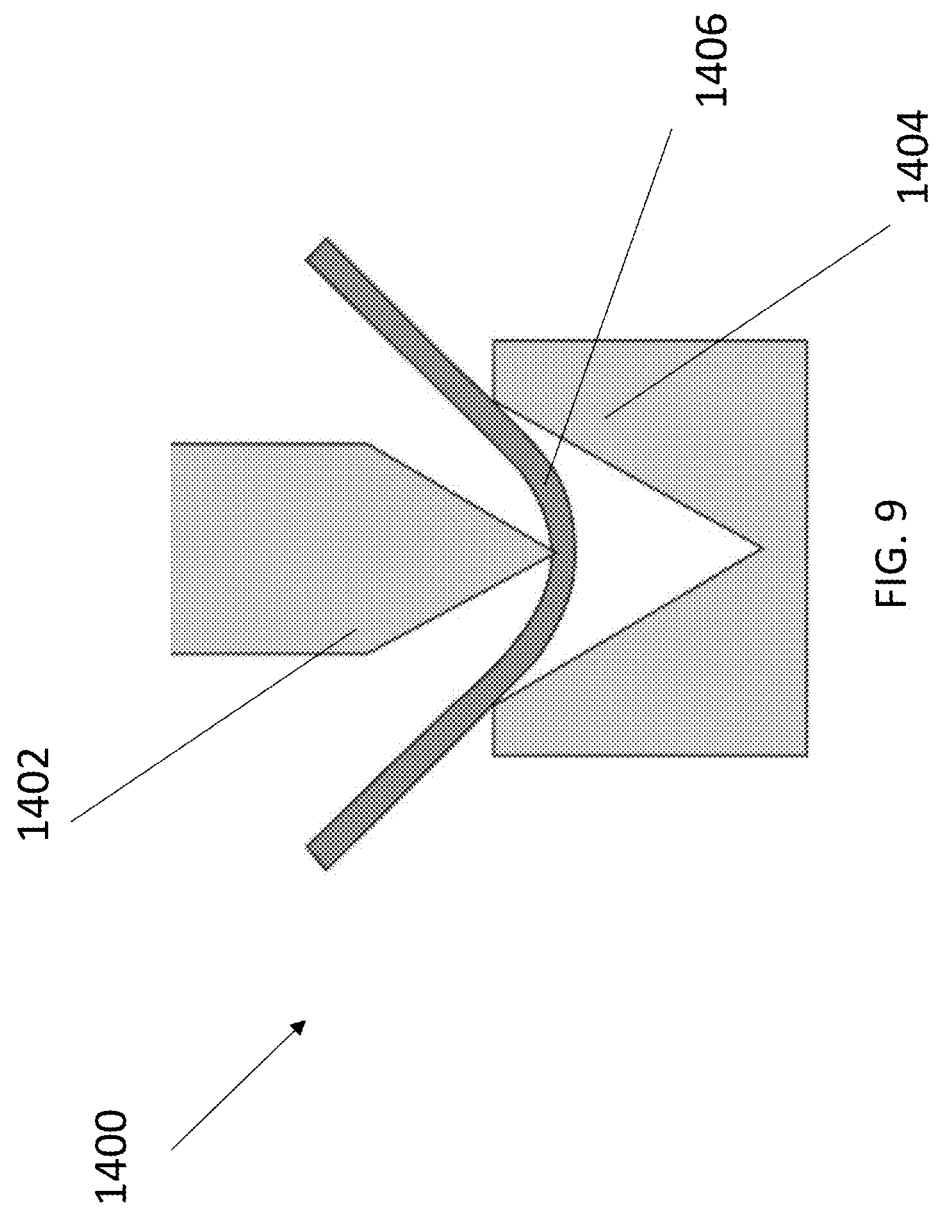
FIG. 9 is a side view of tooling having a press brake die for forming the radius bend of FIG. 4.

Referring to FIG. 9, radius bend 18' of frypot 12' is formed by a tool 1400 having a punch 1402 and a press brake die 1404 that bends sheet metal 1406 to the shape of radius bend 18'. It is noted that bend 18' of frypot 12', for example, a 0.500 inch radius of radius bend 18', requires different tooling than edge 18 of frypot 12 that has a 0.031 inch radius.

Radius bend 18' has a large-radius corner inside frypot 12' of a commercial deep fat fryer 10'. This large radius bend of radius bend 18' inside frypot 10' is located at the usual point of failure. This larger radius bend of radius bend 18' distributes the metal-to-metal contact between fryer basket 14 and frypot 12' over a larger surface area. As a result, frypot 12' is more resistant to premature wear and failure.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

We claim:

1. A frypot of a commercial deep fat fryer comprising:
   a foam deck; and
   a front wall that is a downward extending vertical face of the frypot,
   wherein the foam deck and the front wall are made of a sheet metal that has a radius bend between the foam deck of the frypot and the front wall,
   wherein the radius bend has a bend radius of between 0.25 inches and 1.5 inches, and
   wherein the sheet metal has a thickness, and the thickness of the sheet metal at the foam deck, the radius bend, and the front wall are substantially equal.

2. The frypot of claim 1, wherein the bend radius is between 0.95 and 1.05 inches.

3. The frypot of claim 1, wherein the bend radius is 0.5 inches.

4. The frypot of claim 1, wherein the radius bend has a length of 1 inch.

5. The frypot of claim 1, wherein the sheet metal is stainless steel or cold rolled steel.

6. The frypot of claim 1, wherein the sheet metal is 18 gauge stainless steel.

7. The frypot of claim 1, wherein the sheet metal is 16 gauge stainless steel.

8. A method of forming a frypot, comprising:
   bending sheet metal by a punch and a press break die to form a radius bend between a foam deck and a front wall that is a downward extending vertical face of the frypot, the radius bend between the foam deck of the frypot and the front wall having a bend radius between 0.25 inches and 1.5 inches.

9. The method of claim 8, wherein the bend radius is between 0.95 and 1.05 inches.

10. The method of claim 8, wherein the bend radius is 0.5 inches.

11. The method of claim 8, wherein the radius bend has a length of 1 inch.

12. The method of claim 8, wherein the sheet metal is stainless steel or cold rolled steel.

13. The method of claim 8, wherein the sheet metal is 18 gauge stainless steel.

14. The method of claim 8, wherein the sheet metal is 16 gauge stainless steel.

15. A frypot of a commercial deep fat fryer comprising:
   a foam deck;
   a front wall that is a downward extending vertical face of the frypot; and
   a radius bend between the foam deck of the frypot and the front wall,
   wherein the foam deck, the radius bend, and the front wall are made of a single sheet of sheet metal,
   wherein the radius bend has a bend radius of between 0.25 inches and 1.5 inches, and
   wherein the sheet metal has a thickness, and the thickness of the sheet metal at the foam deck, the radius bend, and the front wall are substantially equal.

16. The frypot of claim 15, wherein the sheet metal is made of 16 gauge steel.

* * * * *